United States Patent Office 3,463,609
Patented Aug. 26, 1969

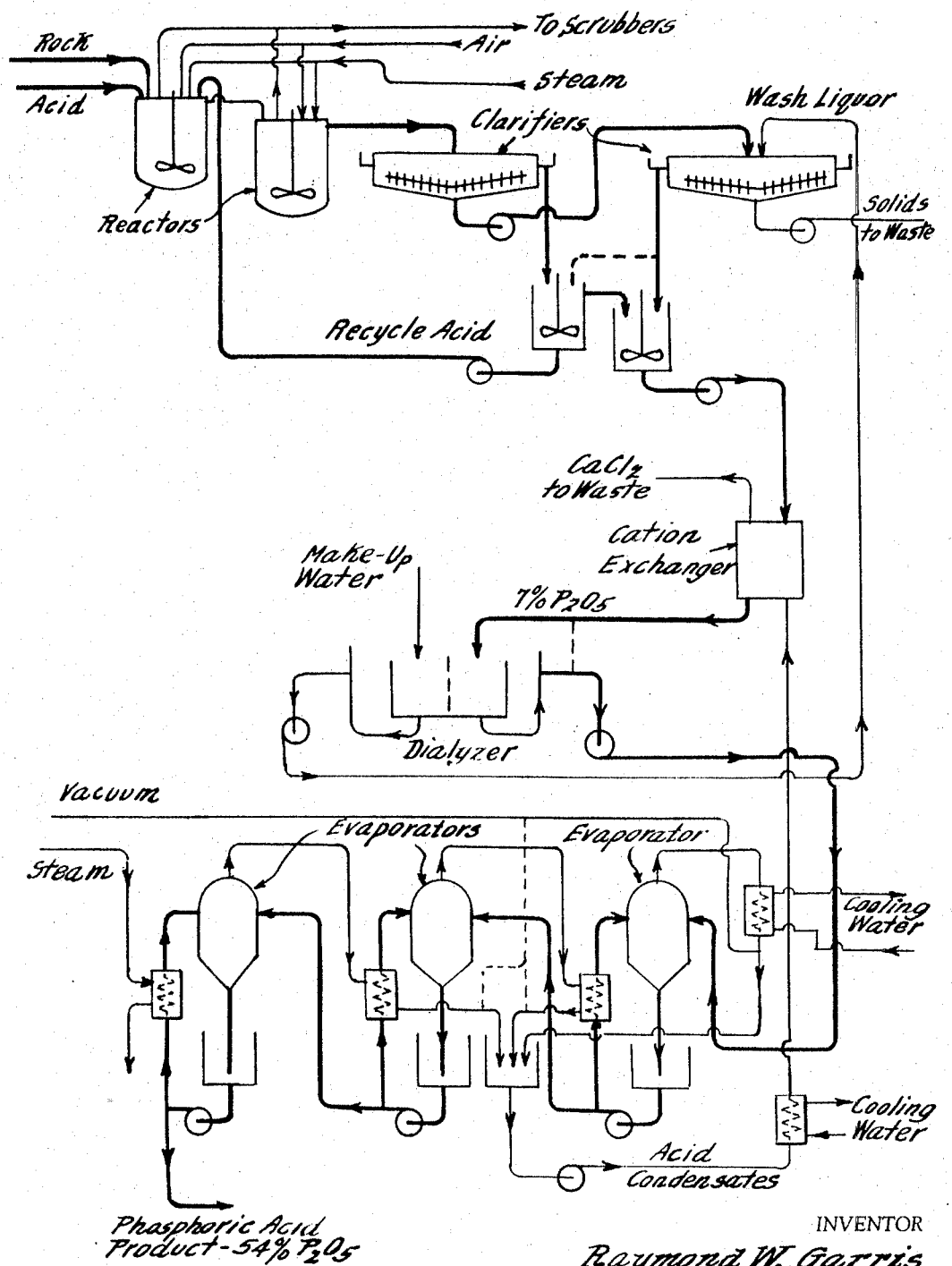

3,463,609
PHOSPHORIC ACID PRODUCTION
Raymond W. Garris, 10445 Classique Ave.,
Baton Rouge, La. 70815
Filed May 4, 1967, Ser. No. 636,074
Int. Cl. C01b 25/22
U.S. Cl. 23—165                                  7 Claims

ABSTRACT OF THE DISCLOSURE

Phosphate rock is reacted with slight excess HCl and recycle acid and clarified. The effluent is passed through a cation exchanger. The weak acid is concentrated preferably by dialysis and evaporation. The acid condensate from the evaporator may be used to regenerate the cation exchanger. By-product recovery, stage operation and recycling may be employed.

BACKGROUND

Currently, most phosphoric acid is made from phosphate rock and sulphuric acid although it is known that other mineral acids are effective although less economical. The increasing cost of sulphur and sulphuric acid make it appropriate to consider other acids. There is an increasing amount of by-product hydrochloric acid available. The process of this invention can be carried out effectively using hydrochloric acid of a strength of 18% HCl. This strength has been chosen because it is somewhat weaker than that produced by azeotropic distillation. Such acid can be readily produced at low cost by concentrating byproduct hydrochloric acid obtained from organic reactions.

According to this process, phosphate rock is digested with hydrochloric acid of 18% strength. This operation is well known, particularly in European technology. Digestion proceeds with somewhat greater facility than when sulphuric acid is used, since there is no gypsum to interfere with the digestion process. The product of the digestion process may be clarified to remove any residual solids and the clarified liquid passed through cation exchange apparatus to produce a liquid made up primarily of phosphoric and hydrochloric acids.

Desirably, the effluent from the ion exchange process is partially concentrated by dialysis. The partially concentrated mixture may be further concentrated and separated into the two acid products by vacuum evaporation. The resultant hydrochloric acid is suitable for return to the process while the phosphoric acid is sufficiently satisfactory for sale.

The single figure of the drawing is a flow sheet illustrating various expedients for carrying out the process in an economical manner.

PREFERRED PROCESS

As shown in the drawing, phosphate rock and hydrochloric acid of about 18% strength are delivered to the first of a series of reactors. The number of reactors used is not critical but is purely a matter of convenience. The rock may be broken up but it is not necessary to have it ground as fine as is commonly practiced with sulphuric acid digestion.

Provision should be made for agitation with air and steam. The steam may be used to get the reaction started initially, whereupon it may be cut off in large measure or entirely, as the reaction will proceed satisfactorily with the aid of the self-generated heat. The air besides providing agitation, also serves in carrying off the fluorine usually present in crude phosphate rock. The digesting tanks should be provided with suction lines for carrying off gases to suitable scrubbers for recovering by-product fluorides.

The digesting tanks are arranged in cascade with the lowest tank arranged to deliver its effluent to a clarifier. Some liquid overflow from the clarifier may be recycled to the digestion tanks, since it will contain significant amounts of unconsumed acid. The underflow from the clarifier is desirably fed to a second clarifier where it is washed with liquid recycled from a subsequent stage of the operation. The overflow from the second clarifier is controlled to produce a product containing about 5% $P_2O_5$ while the underflow containing unreactable solids may be discharged to waste.

The clarified liquid is passed through a cation exchange unit to remove cations such as calcium, magnesium, iron, potassium and possibly aluminum. Suitable resins are Dowex 50 of Dow Chemical Company and Amberlite IR-120 of Rohm & Haas. Due to the cation weight loss, the $P_2O_5$ content may be expected to rise to about 7%. The cation material may be regenerated with hydrochloric acid recovered from a subsequent stage of the process. The wash liquid containing chloride salts of the various cations may be wasted or the salts recovered as desired.

It is preferred to pass the effluent from the ion exchange device to a dialyzer to further concentrate the phosphoric acid content of the liquid stream. This reduces the amount of energy to further concentrate the acid while providing a dilute acid liquor which may be used as the washing agent in the clarifier system.

The liquid stream desirably containing 15 to 20% $P_2O_5$ is then fed to multiple-effect evaporators for further concentration of the phosphoric acid. The consumption of steam may be further reduced by employment of heat exchangers. Since the hydrochloric acid is volatile, it will be removed during the evaporation process. The condensed acid may be returned to the process, conveniently as the regenerating fluid in the cation exchange unit.

The process of this invention produces acid of somewhat superior quality to that of the average wet process acid. Hydrochloric acid is more effective in dissolving phosphate rock than is sulphuric, resulting in more effective removal of the fluorine and requiring less grinding of the rock with consequent saving and grinding costs. As indicated, there is increasing prospect of saving in cost on the acid to be used.

EXAMPLE

By way of example, 100 pounds of a typical phosphate rock, represented as 68 BPL, in crushed form, was placed in a reaction vessel. This rock contained approximately 31.0 pounds $P_2O_5$, 46.0 pounds CaO, and 9.0 pounds silica. To this was added 360 pounds total solution, containing 65 pounds HCl, slightly more than the amount required to convert all of the calcium and other metals to chlorides.

There was also added 464 pounds of liquid obtained from a previous similar reaction, containing 30.7 pounds $P_2O_5$, 44.5 pounds CaO and 64.4 pounds HCl. This represents a recycling rate of 100% and produces a reaction effluent of 853 pounds containing 61.4 pounds $P_2O_5$, 90.0 pounds CaO and 128.8 pounds HCl. The reaction effluent is clarified by decantation and washing of the solids with approximately 45 pounds water.

After deducting an amount of the decanted liquid equivalent to that returned to the reaction vessel, there are available 469 pounds of solution containing 30.7 pounds $P_2O_5$, 44.5 pounds CaO and 64.4 pounds HCl. This solution is passed through a bed of Dowex 50 to yield 430 pounds solution containing 30.4 pounds $P_2O_5$ and 63.8 pounds HCl. Thus, the concentration of $P_2O_5$ is approximately 7.1%.

Since it is impractical to maintain an effective material balance on a pilot plant scale in a dialysis unit, the effluent from the cation exchanger was fed to a triple effect vacuum evaporator. The concentration of $P_2O_5$ increased from 7.1% to 9.9% in the first effect, to 16.5% in the second effect and to 54% in the final effect, yielding 55.7 pounds of total solutions. The condensates from the three effects amount to 373 pounds, containing 63.2 pounds HCl, available for regenerating the ion exchange resin.

I claim:

1. Process of obtaining phosphoric acid from phosphate rock comprising reacting the rock with hydrochloric acid in sufficient amount and strength to convert the preponderate amount of phosphate to acid, clarifying the reaction product to remove suspended solids, passing the clarified reaction product in contact with cation exchange material, initially concentrating the phosphoric effluent from the exchange operation, further concentrating the phosphoric acid by evaporation whereby hydrochloric is volatilized and phsphoric acid free of hydrochloric acid is recovered and volatilized hydrochloric acid is condensed and regenerating the cation exchange material with recovered hydrochloric acid.

2. Process according to claim 1 wherein, after an initiated reaction of rock, HCl and recycle acid, the reaction product is decanted, the decanted acid is at least partially recycled, the underflow is further clarified and washed and the clarified liquid with any unused decanted liquid is passed to the cation exchanger.

3. Process according to claim 2 wherein the initial reaction is carried out in at least two stages with the major portion of the reactants entering the first stage and the reaction proceeding toward completion in the subsequent stage and wherein the decanted acid returned to the reactors contains about half of the acid produced by the reactors.

4. Process according to claim 1 wherein the hydrochloric acid fed to the reaction is of the order of azeotropic strength.

5. Process according to claim 1 wherein the clarified acid fed to the cation exchanger contains about 5% $P_2O_5$.

6. Process according to claim 1 wherein the ion exchanger effluent is first concentrated by dialysis and then by evaporation.

7. Process according to claim 1 wherein the ion exchanger effluent is concentrated by multiple effect evaporation.

References Cited
UNITED STATES PATENTS

| | | | |
|---|---|---|---|
| 3,072,461 | 1/1963 | Long et al. | 23—165 |
| 3,342,549 | 9/1967 | Sakamur et al. | 23—165 |
| 3,374,055 | 3/1968 | Villalon | 23—165 |
| 3,382,035 | 5/1968 | Slater | 23—165 |

OTHER REFERENCES

Kindt et al.: Analytica Chemistry, vol. 24, #9 (September 1952), pp. 1501–02.

HERBERT T. CARTER, Primary Examiner